United States Patent [19]
Hildebrandt

[11] Patent Number: 5,361,012
[45] Date of Patent: Nov. 1, 1994

[54] METHOD AND APPARATUS FOR INCREASING THE EFFICIENCY OF ELECTRICAL ROTARY MACHINES

[76] Inventor: James J. Hildebrandt, 415½ Heliotrope Ave., Corona Del Mar, Calif. 92625

[21] Appl. No.: 996,709

[22] Filed: Dec. 24, 1992

[51] Int. Cl.5 ............................................. H02K 9/00
[52] U.S. Cl. ..................... 310/228; 310/52; 310/63
[58] Field of Search ............... 310/52, 53, 54, 62, 310/63, 57, 227, 228, 220, 221

[56] References Cited

U.S. PATENT DOCUMENTS

| | | | |
|---|---|---|---|
| 265,936 | 10/1882 | Thomson | 310/228 |
| 394,095 | 12/1888 | Buckingham | 310/228 |
| 2,606,946 | 8/1952 | Fisher | 310/228 |
| 2,854,597 | 9/1958 | Foote et al. | 310/228 |
| 3,300,667 | 1/1967 | Boes et al. | 310/228 |
| 3,612,928 | 10/1971 | Hokky | 310/87 |
| 3,714,482 | 1/1973 | Lace | 310/228 |
| 3,743,867 | 7/1973 | Smith, Jr. | 310/52 |
| 3,891,528 | 6/1975 | Griswold | 204/186 |
| 4,086,034 | 4/1978 | Hokky | 417/364 |
| 4,605,581 | 8/1986 | Stevens et al. | 428/96 |

*Primary Examiner*—Steven L. Stephan
*Assistant Examiner*—D. R. Haszko
*Attorney, Agent, or Firm*—Jerry R. Seiler

[57] ABSTRACT

A method and apparatus for introducing a continuous bath of high dielectric liquids to the integral components of an electric motor. One such liquid for example, is methyl chloroform. Significant improvements in efficiency are achieved by the continuous injection or splashing of methyl chloroform or other liquids such as aliphatic hydrocarbons and mixtures thereof, which may include halogens, including chlorine and fluorine. A continuous flow of these fluids and various combinations thereof provide positive commutation between the moving parts of rotary machines such as the bearings, brushes and commutator surfaces in the operation of a DC motor.

11 Claims, 5 Drawing Sheets

METHOD AND APPARATUS FOR INCREASING THE EFFICIENCY OF ELECTRICAL ROTARY MACHINES

BACKGROUND OF THE INVENTION

1. Field of the Invention

The present invention relates generally to increasing the efficiency characteristics of electromagnetic machines, including direct current motors, generators and other related components and systems which use frictionally engaged rotating parts such as bearings, brushes and commutators. More specifically, the present invention relates to a method for introducing a continuous bath of high dielectric liquid to the components of such machines, including electric motors and the like to reduce operating temperature, sparking, friction and resistance and to clean surfaces of carbon, ash and metal particulates for increasing the efficiency and longevity of the components of electromagnetic machines while they are in operation.

2. Prior Art

With the depletion of fossil fuels, the imminent need for alternative power resources has focused much research and development emphasis on the use of electric and solar electric alternatives. One example of this emphasis is the current interest in replacing the internal combustion engine in automobiles with battery operated electric motors. Although the emphasis of research and development has been placed on the storage of electricity by developing lighter, more efficient batteries or more efficient solar collectors, another important aspect of the use of electric and solar electric alternatives to fossil fuel devices is increasing the efficiency of electric motors in a cost effective manner. The inventor herein has found that a significant increase in electromagnetic machine efficiency can be achieved by providing a continuous bathing of the components thereof with highly dielectric liquids, while the machine such as a DC motor or generator is in operation.

Although there is prior art in the form of issued U.S. patents which disclose various means for lubricating the moving parts of electrical machinery, none of such prior art discloses the use of highly dielectric liquids which may be applied to the components of electric motors, such as its brushes, even while the electric motor is running. By way of example, the following U.S. patents appear to be the most relevant to the present invention.

U.S. Pat. No. 3,300,667 to Boes et al is directed to an electrically conductive solid lubricant. Referring to FIG. 2, an electrical brush 14 has particles 16 of the solid lubricant distributed throughout the brush body. The solid lubricant may be niobium disulfide and diselenide and disulfide tantalum. This reference discloses at Column 3, beginning at approximately line 7, that the good electrical conductor and good anti-friction properties of the above compounds render them highly useful as a lubricant in brushes. It should be noted that this reference discloses at Column 6, beginning at approximately Line 45, that the disclosed lubricants may be incorporated into a resin which itself offers some lubrication characteristics, such as polytetrafluoroethylene. This reference does not disclose that the lubricants may be applied to the brushes while the electric motor is running.

U.S. Pat. No. 4,605,581 to Stevens et al is directed to a method of treating a carbon current collection brush. Referring to FIG. 1, a carbon current collection brush 11 is made by impregnating a brush blank with a treating solution comprising an organo-metallic compound and an organic resin, and curing the resin. The preferred resins include cycloaliphatic epoxy resins and a halogen containing bisphenol A diglycidyl ether epoxy resins. The organo-metallic compound and organic resin impart improved wear characteristics and anti-friction properties to the brush blank.

U.S. Pat. No. 3,714,482 to Lace is directed to a brush wear inhibitor for dynamoelectric machines. Referring to FIG. 1, the dynamoelectric machine comprises an alternator 10 having contact brushes 40 and 41. The contact brush 40 is coated and/or impregnated with a compound of octadecylamine which includes a hydrohalogen radical in the form of HX, where X is either chlorine, bromine, iodine, fluorine, or astatine.

U.S. Pat. No. 2,854,597 to Foote et al is directed to the lubrication of rubbing surfaces between brushes and collector rings in an electrical apparatus. The brush 10 is impregnated with a liquid vehicle such as polyalkylene glycol, which contains particles of a dry lubricant such as molybdenum disulfide or silver sulfate. It should be noted that this reference discloses at Column 2, beginning at approximately Line 8, that the dry lubricant is constantly fed to the rubbing surface between the brushes and conductor rings by the liquid vehicle.

Virtually any lubricant supplied to a moving part reduces friction and thus increases efficiency and longevity. However, the need for labor intensive frequent reapplication of such lubricants makes it highly desirable to find a method and apparatus for applying such lubricants in a constant manner, without requiring frequent maintenance. Furthermore, many electromagnetic machines, such as DC motors, generators and the like are used in configurations where it is virtually impossible to periodically add some form of lubricant to the moving parts without having to disassemble the entire machine, thus rendering it cost ineffective to attempt to keep the machine operating at its optimum efficiency. There is therefore an ongoing need for an innovative means for accomplishing the aforementioned improvement in electromagnetic machine operating efficiency, without incurring the aforementioned disadvantages of the prior art.

SUMMARY OF THE INVENTION

The present invention provides a method and apparatus for addressing the most significant cause of DC motor inefficiency, namely contact between rotating frictional components such as the brushes, typically comprised of carbon, and the commutator. Significant inefficiencies result from the contact of the brushes with the surface of the commutator. The primary adverse effects of such continuous contact includes the accumulation of particulates of carbon and ash eroded from the brushes during operation. These particulates pass between the brushes and the commutator surface, creating less effective commutation which results in excessive friction, increased temperature, vibration and premature erosion of the surfaces of both the brushes and the commutator, as well as other moving components within the motor. All of these effects are exacerbated in environments where humidity is low or in the presence of additional environmental elements, such as dust. The present invention provides a method and apparatus for introducing a continuous bath of high dielectric liquids to the integral components of an electric motor. One such liquid for example, is methyl chloroform. Significant improvements in efficiency are achieved by the continuous injection or splashing of methyl chloroform or other liquids such as aliphatic hydrocarbons and mixtures thereof, which may or may not include halogens, including chlorine and fluorine. A continuous flow of these fluids and various combinations thereof provide positive commutation between the brushes and commutator surfaces and reduces bearing surface wear in the operation of the DC motor.

The method of the present invention can be carried out in any manner which provides a continuous supply of such liquid to the area of the brushes and commutator, but so that application of the highly dielectric liquid to that area is carried out continuously and without manual intervention. A number of different such embodiments are disclosed herein. By way of example, one such apparatus comprises a low volume external pump type system which can be integrally connected to a DC motor. Another example is the use of an internal impeller pump affixed to the main shaft of the DC motor. Whether the pump system is external or internal, it has been found advantageous to employ a filter to eliminate particulates of approximately 40 microns or larger, released by the brushes and which would otherwise accumulate in the bathing process. A number of other alternative methods for introducing the highly dielectric fluid into the operating portion of the electromagnetic machine are disclosed herein. The primary function of each is to provide a relatively consistent volume of fluid between the brush, commutator and bearing surfaces to reduce the operating temperature of the bearings and brushes, to reduce sparking, friction and resistance, to increase commutation performance, reduce brush and commutator wear and clean the surfaces of carbon, ash and metal particulates from the commutator in a continuous manner. This results in improved efficiency, smoother transition through different speed ranges, quieter operation and even a reduction in the production of electrical noise interference.

It should be understood that the present invention is not limited for use with only DC machines or with only brush-type components thereof. For example, significant efficiency improvements may also be realized using the present invention in AC machines and in brushless DC machines. Furthermore, further refinements are also contemplated, such as concurrently dielectric liquids of different viscosities at different locations within the machines and recovering each such liquid in a separate reservoir. The use of feedback to vary liquid parameters, such as temperature or viscosity, as a function of efficiency, is also contemplated. Accordingly, the description herein of a preferred embodiment of the invention should be deemed as exemplary only and not limiting of the scope of protection afforded hereby.

OBJECTS OF THE INVENTION

It is therefore a principal object of the present invention to provide a method and apparatus for increasing the efficiency of electromagnetic machines.

It is an additional object of the present invention to improve the efficiency and performance of electrical machines, such as DC motors by introducing a continuous bath of highly dielectric liquids into such motors and particularly between the surfaces of frictionally engaged rotating components such as the brush and commutator of DC motors.

It is still an additional object of the present invention to improve the efficiency of DC motors by providing systems which introduce the continuous flow of highly dielectric fluids, such as methyl chloroform, particularly between the brushes and commutator of a DC motor to reduce operating temperature, sparking, friction and resistance, as well as to reduce brush and commutator wear and to remove particulates and other forms of waste material.

BRIEF DESCRIPTION OF THE DRAWINGS

The aforementioned objects and advantages of the present invention, as well as additional objects and advantages thereof, will be more fully understood hereinafter as a result of a detailed description of preferred embodiments when taken in conjunction with the following drawings in which.

DETAILED DESCRIPTION OF PREFERRED EMBODIMENTS

Figure 1:
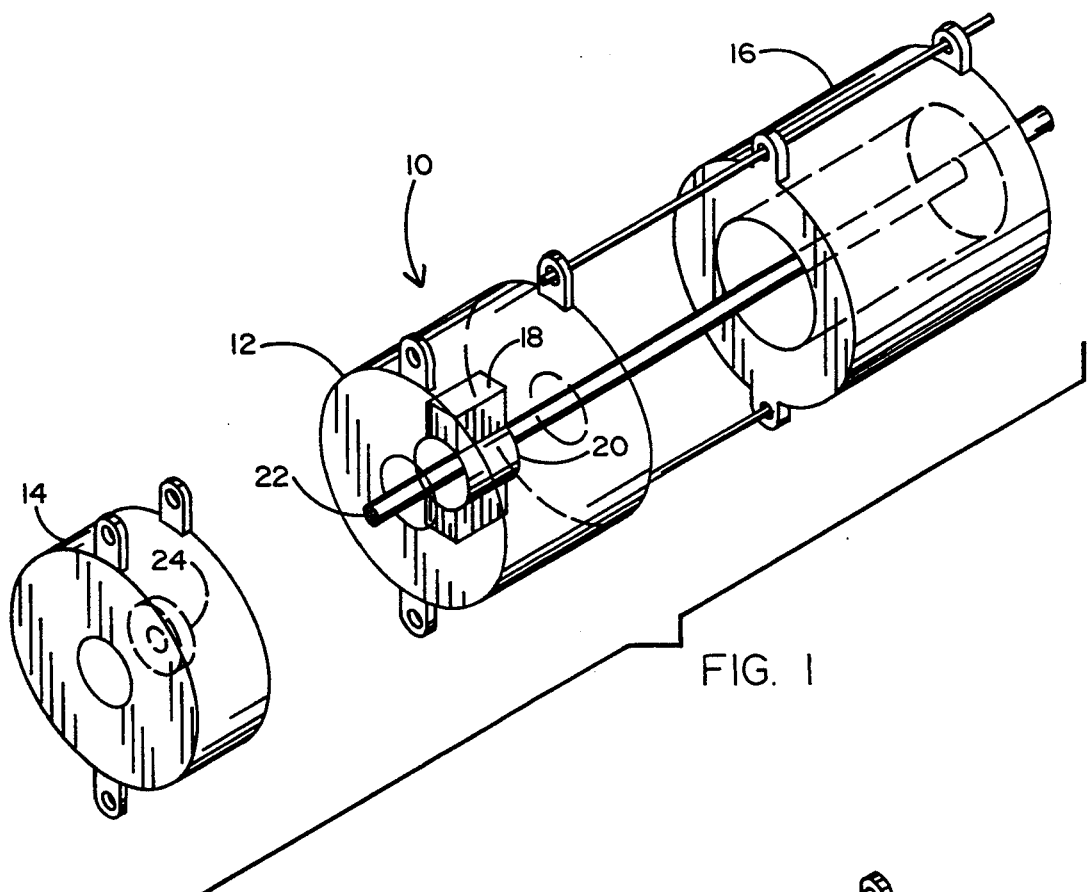
FIGS. 1 and 2 represent exploded and assembled views, respectively, of an electric motor incorporating a dielectric fluid circulating apparatus of the present invention.
Figure 2:
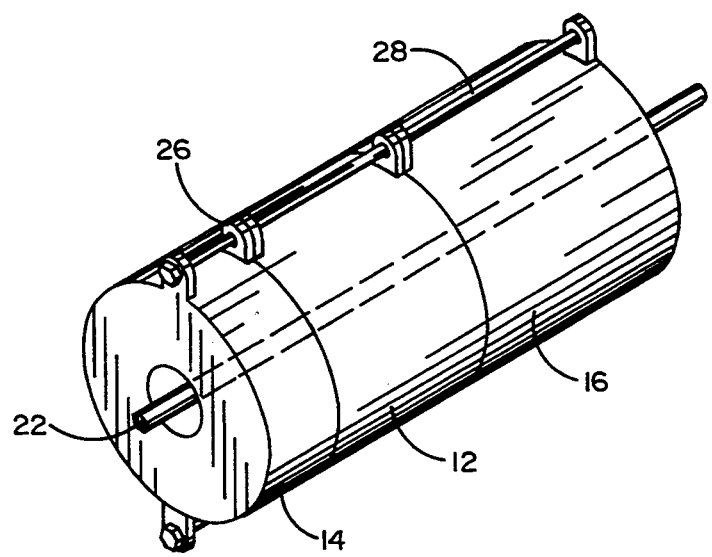
Figure 3:
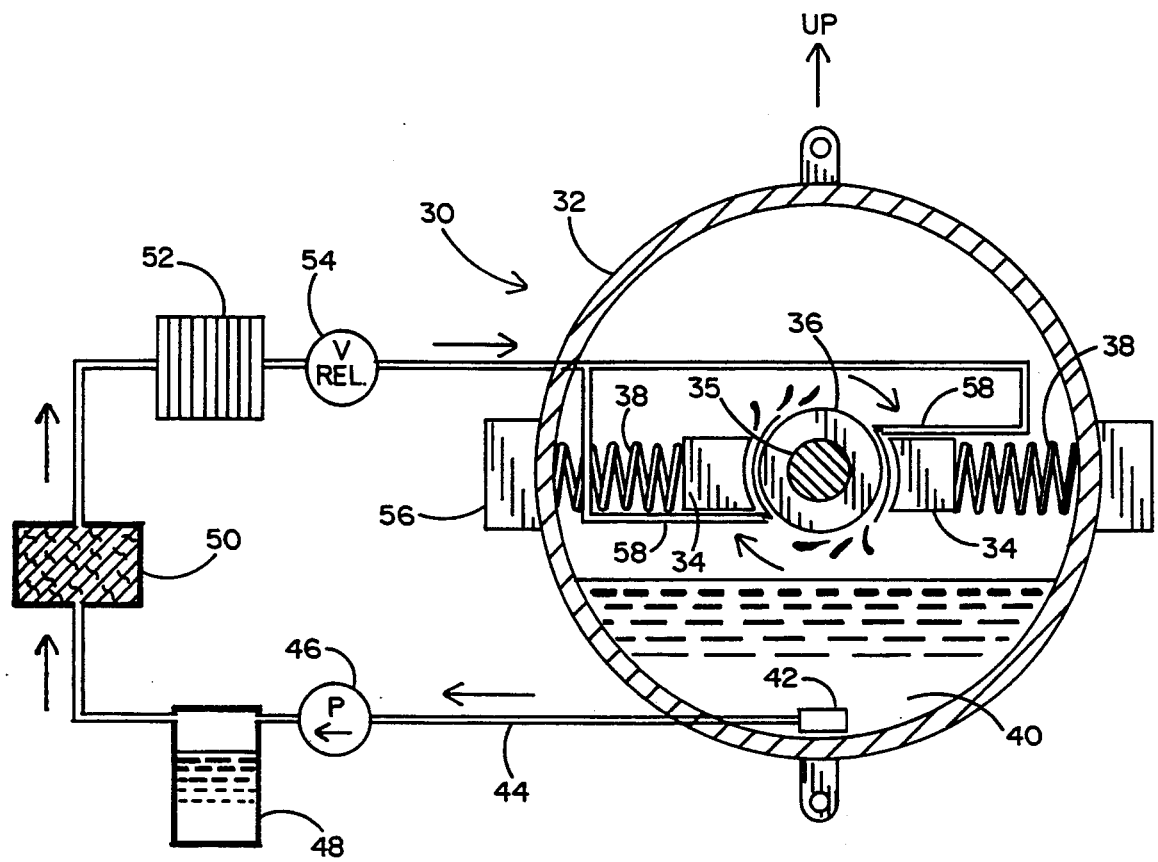
FIG. 3 is a diagrammatic illustration of a DC motor of the present invention, employing a low volume external pump connected thereto for the purpose of carrying out the method described herein.

Referring now to the accompanying drawings and specifically FIGS. 1 and 2 thereof, it will be seen that a first embodiment 10 of the present invention comprises a DC motor having a commutation housing 12, a regenerator housing 14 and a motor winding housing 16. The commutation housing 12 provides an enclosure for the brushes 18 and commutator 20. A rotated shaft 22 extends the full length of the first embodiment 10. The commutation housing 12 is designed to contain a highly dielectric liquid which is used to continually bath the surface of the brushes immediately adjacent the commutator in a manner to be described hereinafter. Regenerator housing 14 provides the support for the end of the shaft 22 by means of bearing 24 and can be removed to service the interior of the commutation housing, without the disruption of the final drive and armature. The motor winding housing 16 encloses all of the motor windings separately from the commutation housing. A plurality of bolt flanges 26 and elongated bolts 28 provide a simple yet reliable method for interconnecting the housings into one rigid unit as shown in FIG. 2.

A second embodiment 30 of the present invention comprises a DC motor 32 having brushes 34 and a commutator 36, the brushes being compressed against the commutator by tension springs 38 in a conventional manner. A highly dielectric liquid 40 is contained within the bottom portion of the DC motor 32 in the form of a pool or reservoir, at the bottom of which there is a pick-up sump 42. The sump 42 leads to a circulation line 44 which is connected to a pump 46, a reservoir 48 a filter 50, a radiator 52 and a pressure control valve 54. Circulation line 44 connects this external loop back to the DC motor and more specifically to an injector 58, associated with each brush 34, whereby filtered and cooled dielectric liquid 40 can be constantly introduced into the region between the brushes and the commutator for the purposes described herein. A pair of access caps 56 provides access to the interior of the DC motor 32 in order to maintain and service the motor such as for replacement of brushes and the like.

Figure 4:
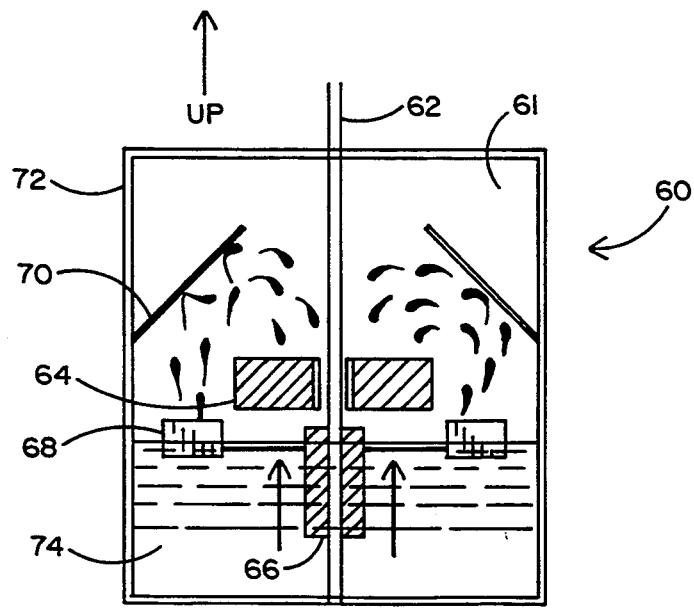
FIG. 4 illustrates an alternative splash mechanism that may be used to achieve the advantageous constant lubricating effect of the present invention.

A third embodiment 60 of the present invention is shown in FIG. 4. As seen therein, a DC motor 61 provides a rotating shaft 62, brushes 64 and a commutator (not shown) in a conventional manner within the housing 72. However, unlike conventional DC motors, the present invention also provides a worm gear 66 to which there is attached a splash paddle 68 which is positioned to lie at or near the surface of a reservoir of dielectric liquid 74. The paddle rotates upon rotation of the shaft and worm gear, thus splashing the liquid upwardly toward a pair of deflectors 70. The angle of the deflectors is selected to re-direct the droplets of liquid 74 onto the brushes 64 to accomplish the dielectric liquid bathing of the brushes as seen in the earlier disclosed embodiment of the invention.

Figure 5:
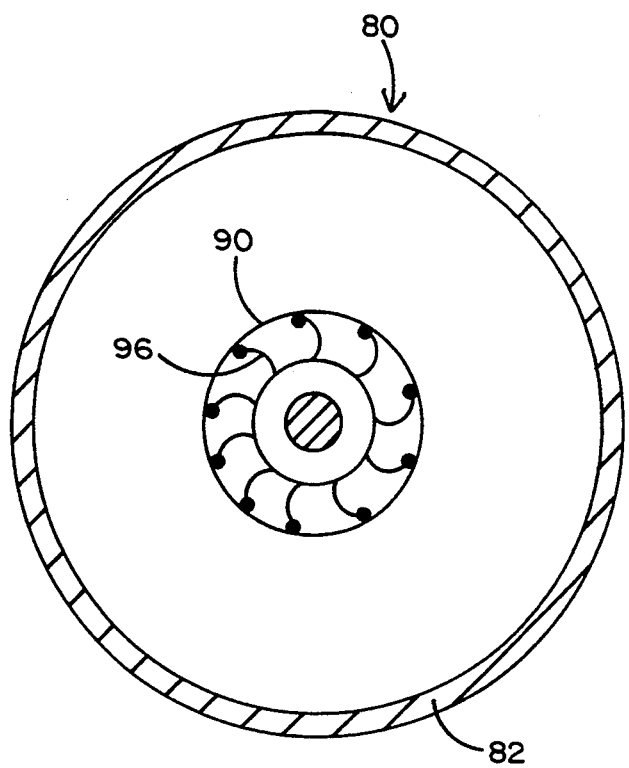
FIGS. 5 and 6 provide a cross-sectional end view and a cross-sectional side view, respectively, of an apparatus of the present invention wherein an internal impeller pump is affixed to the main shaft of a DC motor.
Figure 6:
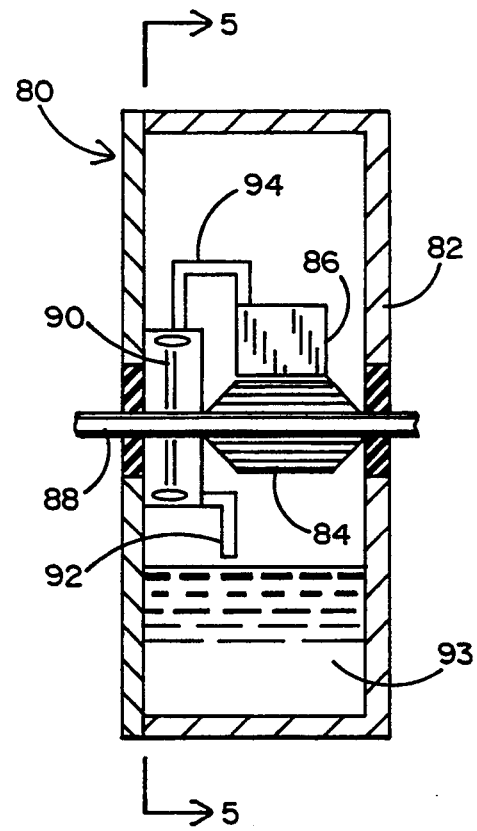
Figure 7:
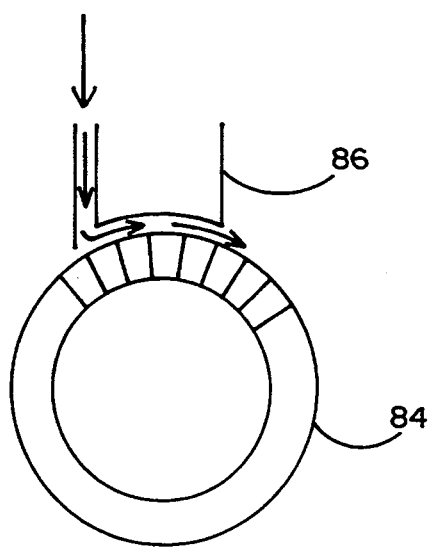
FIGS. 7 and 8 illustrate front and side views respectively, of one method of introducing the highly dielectric liquid of the present invention into the brushes of a DC motor.
Figure 8:
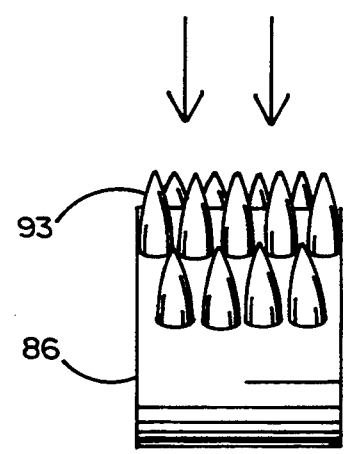

Still an alternative fourth embodiment of the present invention is shown in FIG. 5 and 6. This embodiment 80 comprises a DC motor having a housing 82, a commutator 84, brushes 86 and a shaft 88, all of which may be provided in a conventional manner. However, unlike conventional DC motors, the fourth embodiment of the present invention shown in FIGS. 5 and 6 provides an internal impeller pump 90, which is affixed to the shaft 88 for operation therewith and which provides an inlet 92 and an outlet 94. The inlet 92 is positioned at or near the surface of a reservoir of dielectric liquid contained within the housing 82. The impeller pump 90 causes a suction effect through the inlet 92 which raises a stream of the liquid 93 through the pump and into the outlet 94 by means of the pumping effect of rotating pump blades 96. As seen in FIGS. 7 and 8, the dielectric liquid 93 rolls down the side surface of the brush 86 and accumulates in the region between the brush 86 and the commutator 84, the liquid preferably adhering in large droplets to the brush 86 as shown in FIG. 8.

Figure 10:
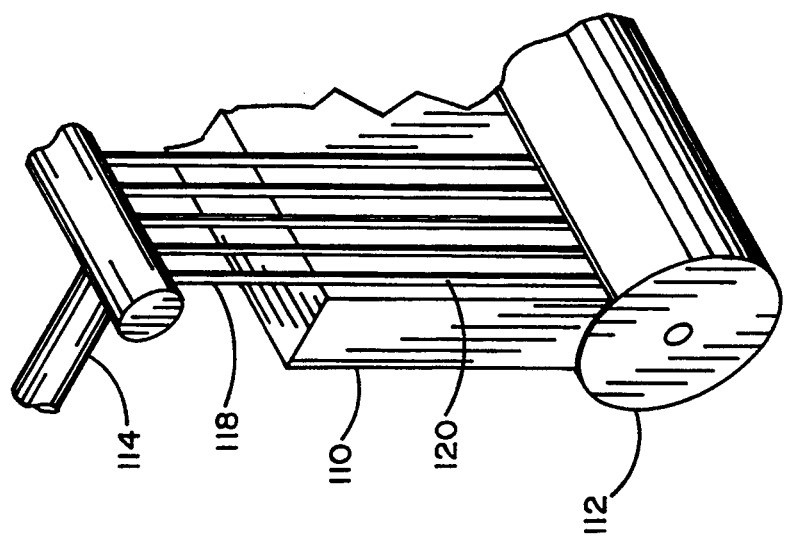
FIGS. 9 and 10 illustrate two additional alternative methods for providing a constant application of dielectric liquid to a brush/commutator interface in an electric motor.
Figure 9:
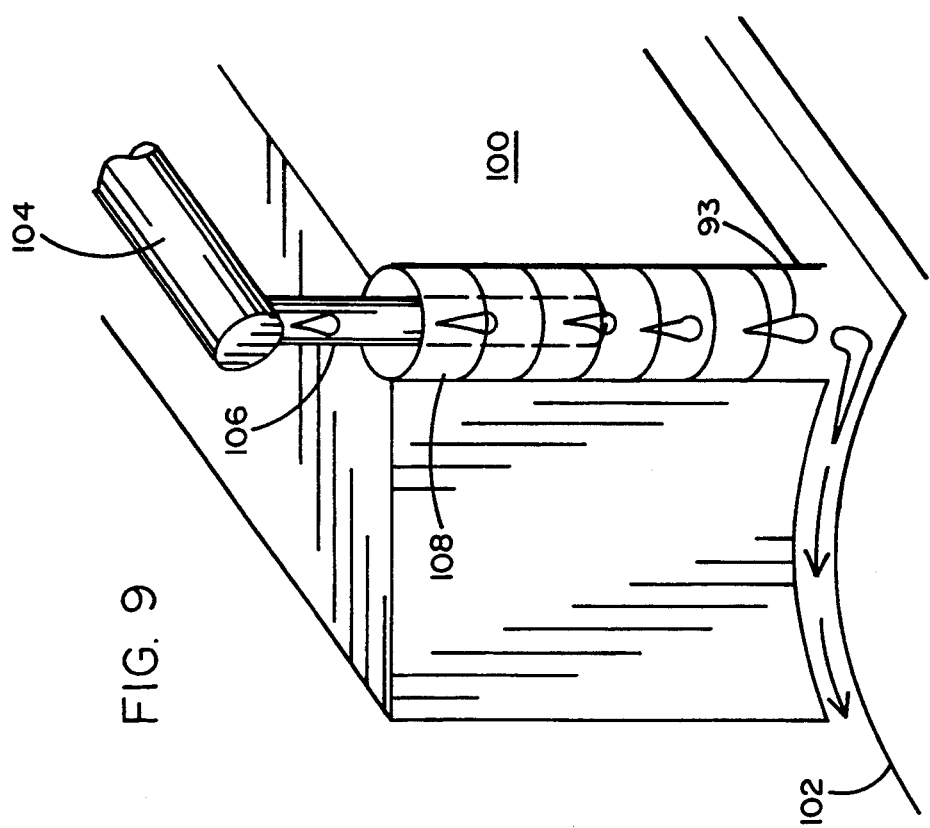

In addition to simply permitting the dielectric liquid to roll down the sides of the brushes, the present invention also contemplates the use of injectors and modifications to the brush structure to more accurately apply the dielectric liquid to the desired location between the brushes and the commutator. This aspect of the invention is shown in FIGS. 9 and 10, wherein in FIG. 9 a brush 100 is shown positioned adjacent a commutator 102. A liquid inlet 104 is positioned adjacent to and above the brush 100 and provides at least one injector 106 which is partially inserted into a passage 108 in the structure of the brush and which extends the full height of the brush, whereby dielectric liquid 93 when delivered by the inlet 104 and injector 106, flows through the passage 108 into the region between the brush and the commutator. A similar configuration is shown in FIG. 10, wherein a brush 110 is positioned adjacent a commutator 112 and an inlet 114 provides a plurality of parallel injectors 118 which are positioned in channels 120, provided in the side of the brush 110, whereby dielectric liquid is applied directly to the region between the brushes and the commutator.

Figure 11:
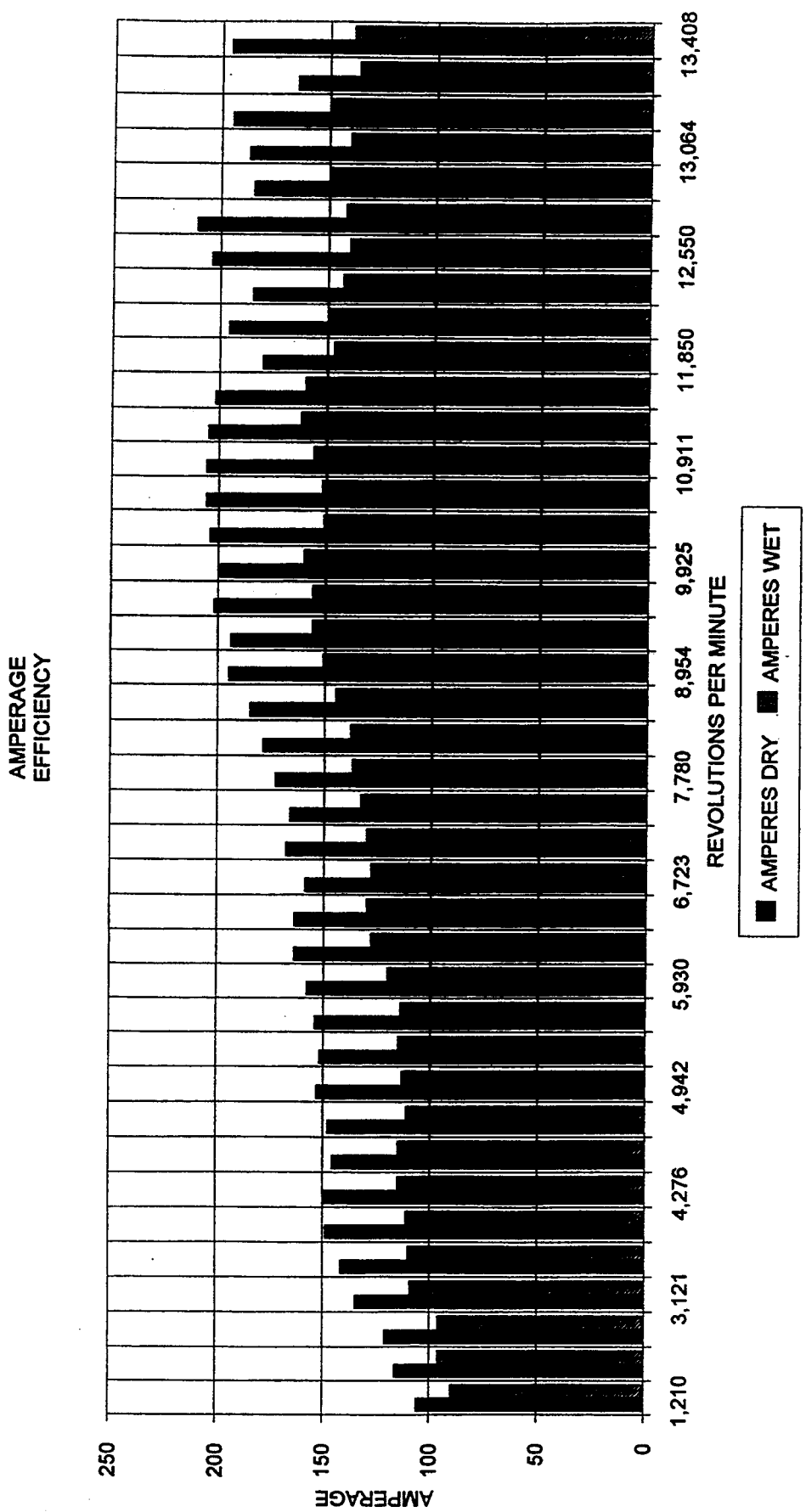
FIG. 11 is a graphical representation of efficiency (based on current) versus rotational speed for a DC motor with and without use of the invention.

FIG. 11 provides demonstrative evidence of the advantageous results derived from the present invention. The graph of FIG. 11 illustrates significant reduction in current required to operate a DC motor at different speeds between about 1200 RPM and about 13,400 RPM when a continuous bath of dielectric liquid is applied to the brushes and commutator thereof as disclosed herein. The average improvement in operating efficiency between "wet" and "dry" operation over the entire range of speeds was about 60 percent. The motor was operated under a no-load condition. However, comparable results under load conditions are anticipated.

Of course, it will be understood that the key aspect of the present invention resides in the introduction of a continuous bath of highly dielectric liquid into the components of an electric motor. As presently contemplated, the best mode of carrying out the present invention employs the use of a high dielectric liquid, such as methyl chloroform and/or a solution of aliphatic hydrocarbons and mixtures thereof, which may or may not include halogens, including chlorine and fluorine. A continuous flow of these fluids provides positive commutation between the brushes and commutator surface in a DC motor. It has been found in fact, that such a continuous liquid bath of highly dielectric liquid increases the performance of a DC motor by reducing sparking, friction and resistance therebetween, as well as by reducing operating temperature, by providing superior commutation, by reducing brush and commutator wear, by cleaning the surfaces of the motor parts of carbon, ash and metal particulates and by providing quieter operation and smoother transition through different speed ranges. In addition, the present invention may reduce electrical interference in certain frequencies, thereby reducing or eliminating noise interference generally caused by motor operation adjacent sensitive electronic devices, such as communication systems and the like.

It will now be understood that what has been described herein comprises a novel method and apparatus for improving the efficiency of electromagnetic devices including for example DC motors, by continuously bathing, frictionally engaged moving parts thereof. Such parts include the brushes and commutator. The bathing fluid is preferably a high dielectric liquid such as methyl chloroform, aliphatic hydrocarbon solution and mixtures thereof which may include halogens such as chlorine or fluorine. A number of different embodiments of apparatus for applying such a bath of highly dielectric liquid to the brushes and commutator of a DC motor have been shown herein by way of example. It has been found that the invention provides a significant improvement in motor operating efficiency, as well as a significant decrease in brush and commutator wear over equal periods of time, thereby making the present invention especially advantageous for applications which require high reliability and high efficiency, such as for use in electrical powered vehicles.

It will now be apparent to those having skill in the art to which the present invention pertains, that various modifications and additions may be made to the invention. By way of example, the specific high dielectric liquids disclosed herein, as well as the various alternative means for applying such liquids as a continuous bath to a rotary machine while it is running, may be readily altered while still achieving the objects of the invention recited herein. The present invention may also be suitable for use in rheostats, controllers, AC inverters and other such devices. Accordingly, all such modifications and additions are deemed to be within the scope of the invention which is to be limited only by the claims appended hereto and their equivalents.

I claim:

1. In an electric rotary machine of the type having a commutator and brushes; an improvement comprising:
   methyl chloroform; and
   means for applying said methyl chloroform continuously to said brushes adjacent said commutator while said machine is running.

2. The machine of claim 1 wherein said applying means comprises a pump external of said machine; a reservoir of said methyl chloroform connected to said pump; and
   fluid lines connected between said machine and said pump for transferring said dielectric fluid between said pump and said machine.

3. The machine of claim 1 wherein said applying means comprises:
   a pump connected within said machine to a rotating member of said machine; and
   fluid channels connected to said pump for delivering and recovering said methyl chloroform.

4. The machine of claim 1 wherein said applying means comprises:
   a paddle within said machine and connected to a rotating member of said machine;
   a reservoir of said methyl chloroform in said machine;
   said paddle being positioned relative to said reservoir for splashing said methyl chloroform; and
   deflectors for directing said splashed methyl chloroform onto said brushes.

5. The machine of claim 1 further comprising:
   at least one injector for delivering said methyl chloroform to said brushes; and
   at least one channel in said brushes for receiving said injector.

6. The machine of claim 1 wherein said machine comprises a DC motor.

7. The machine of claim 1 further comprising means to remove particulates greater than a selected size from said methyl chloroform.

8. The machine of claim 1 further comprising means to cool said methyl chloroform.

9. A method for increasing the efficiency of electric rotary machinery of the type having a commutator and brushes; the method comprising the steps of:
   a) providing methyl chloroform; and
   b) continuously bathing an area of said brushes adjacent said commutator with said methyl chloroform while said machine is running.

10. In a rotary machine having rotating components; an improvement comprising:
    a source of methyl chloroform;
    means for applying said methyl chloroform to said components in a substantially continuous manner while said machine is running; and
    means for recovering and reusing said methyl chloroform in said applying means.

11. The machine of claim 10 wherein said rotary machine is a DC motor and wherein said components comprise the bearings, brushes and commutator of said DC motor.

* * * * *